UNITED STATES PATENT OFFICE 2,647,898

ISOLATION OF 2,4-DIAMINOPTERIDINES

John A. Schmitt, Kalamazoo, Mich., assignor to The Upjohn Company, Kalamazoo, Mich., a corporation of Michigan No Drawing. Application July 22, 1950,
Serial No. 175,480

4 Claims. (Cl. 260—251.5)

This invention relates to an improvement in the isolation of 2,4-diaminopteridines from aqueous solutions, more particularly to a method of the isolation of 2,4-diamino-6-(and 7) polyhydroxyalkylpteridines from reaction mixtures containing the same, by means of boric acid in the presence of sulfate ion.

The preparation of 2,4-diamino-6-(and 7) substituted pteridines having the formula:

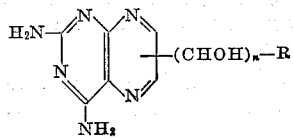

wherein $n$ is a member of the group of numbers consisting of zero and the integers one to three, inclusive and R is a member of the group consisting of —$CH_2OH$ and $COOH$ has been described and claimed in the copending applications of Harold G. Petering, Serial No. 175,477 and Harold G. Petering and John A. Schmitt, Serial No. 175,478 filed of even date herewith, now Patent No. 2,568,462. According to these copending applications polyhydroxyaldehydes, polyhydroxyketones, polyhydroxyketo acids and polyhydroxyketoaldehydes when heated in slightly acid solution with 2,4,5,6-tetraamino-pyrimidine give products having the formula as given above. In order to obtain useful yields of the 6-substituted pteridines the condensation of a polyhydroxyaldehyde, polyhydroxyketone or polyhydroxyketo acid is carried out in the presence of hydrazine while no hydrazine is required when a polyhydroxyketoaldehyde is one of the reactants. A portion of the product can be isolated from the hot reaction mixture by cooling, the desired product precipitating from the reaction mixture. However this method of isolation yields only a small part of the total pteridine which has been formed. Various expedients such as neutralization of the reaction mixture before cooling, concentration and the like have been tried in an attempt to isolate a satisfactory percentage of the pteridine that is known to be present in the reaction mixture. These procedures, while helpful, leave much to be desired as much of the desired product remains in solution.

It is an object of this invention to provide a method for the isolation of 2,4-diaminopteridines from aqueous solutions. An additional object is the provision of a method for the isolation of 2,4-diamino - 6 - (and 7) polyhydroxyalkylpteridines, and mixtures thereof, from reaction mixtures containing the same. Other objects of the invention will become apparent hereinafter.

The objects of this invention have been achieved as a result of finding that the addition of boric acid, in the presence of sulfate ion to an aqueous solution of a 2,4-diaminopteridine gives a product of greatly decreased solubility, making it possible to isolate a greatly increased quantity of 2,4-diaminopteridine without concentrating the solution. This effectiveness of boric acid in the isolation of 2,4-diaminopteridines is unexpected since it is of no assistance in the isolation from solutions of similar 6 or 7 substituted 2-amino-4-hydroxypteridines. The boric acid accomplishes this result by forming a complex with the 2,4-amino groups of the pteridine which is less soluble in aqueous solutions than is the free base.

In carrying out the method of this invention sulfate ion and boric acid are added to the pteridine solution, which can be either hot or cold. Since one of the most important uses of the method of this invention is the isolation of 2,4-diaminopteridines from reaction mixtures resulting from their preparation a preferred form of the present method contemplates the presence of boric acid and sulfate ion in hot solutions of 2,4-diaminopteridines such as are obtained when producing the particular pteridine to be isolated. It has been further found that when polyhydroxyaldehydes and the like, as previously mentioned, are condensed with 2,4,5,6-tetraaminopyrimidine to produce 2,4-diamino-6-(and 7) polyhydroxyalkylpteridines boric acid has no influence upon the reaction so that it is not necessary to wait until the condensation is complete before adding the boric acid. Accordingly, one modification of the process of this invention contemplates the addition of boric acid and sulfate ion to the reaction mixture used for the preparation of 2,4-diamino-6-(and 7) polyhydroxyalkylpteridines at any time prior to the completion of the condensation, while another modification contemplates this addition after the reaction has been completed. An additional preferred modification of the present method contemplates precipitating the pteridine-boric acid complex from a neutral solution.

The presence of sulfate ion in the solution is also necessary for the successful results achieved by the process of this invention. In its absence the results achieved by the addition of boric acid are not significantly different from those obtained when no boric acid is present. When 2,4,5,6-tetraaminopyrimidine sulfate is used to obtain the free base which is condensed with the other reactants, it is not necessary to add additional sulfate ion to the reaction mixture. When 2,4,5,6-tetraaminopyrimidinehydrochloride, or other salt, is used in the condensation the addition of sulfate ion, preferably as a sulfate salt such as sodium or ammonium sulfate is required.

The following examples are illustrative of the spirit and scope of the method of this invention, which is not limited thereto as various modifications as to manipulative procedure will be apparent to those skilled in the art.

*Example 1.—Isolation using boric acid in the absence of sulfate ion*

A dry mixture was prepared containing 530 milligrams of 2,4,5,6-tetraaminopyrimidinedihydrochloride, 900 milligrams of L-sorbose, 680 milligrams of sodium acetate trihydrate and 300 milligrams of boric acid. A solution of 0.3 milliliter of 85 percent hydrazine hydrate and 0.7 milliliter of glacial acetic acid in 6.5 milliliters of water was added to the dry mixture and the reaction mixture warmed to seventy degrees centigrade for two hours. At this time the reaction solution was orange-brown in color and had a pH of between about five to about six. A small precipitate appeared in the hot solution which was removed and the filtrate adjusted to pH 7.0 by the addition of ammonium hydroxide. After cooling, the precipitate which had separated, was collected, washed with water, alcohol and ether. After drying at sixty degrees centigrade under reduced pressure fifty milligrams of 2,4-diamino-6-tetrahydroxybutylpteridine was obtained.

*Example 2.—Addition of boric acid, in the absence of sulfate ion, after completion of the condensation*

The reactants, and quantities used were the same as in Example 1. The boric acid was omitted from the dry mixture, otherwise the condensation procedure was identical with that of Example 1. After heating the reaction mixture for two hours at seventy degrees centigrade 300 milligrams of boric acid was added to the hot reaction mixture. Upon cooling the light tan precipitate which appeared was collected, washed with water, alcohol and ether. After drying fifty milligrams of 2,4-diamino-6-tetrahydroxybutylpteridine was obtained.

*Example 3.—Addition of boric acid and sulfate ion after completion of the condensation*

The reactants and quantities used for the condensation were those of Example 1 with the boric acid being omitted from the dry mixture. After heating the reaction mixture for two hours at seventy degrees centigrade, the hot solution was filtered to remove the small precipitate which appeared. The pH of the hot filtrate was adjusted from about 5.0 to 7.0 by the addition of ammonium hydroxide as in Example 1. The solution was cooled to about five degrees centigrade for about sixteen hours but no further precipitation took place. The solution was warmed to room temperature and 300 milligrams of boric acid and 660 milligrams of ammonium sulfate were added. Upon cooling a copious precipitate separated which was collected, washed with water, acetone and ether. After drying at sixty degrees centigrade under reduced pressure 430 milligrams of 2,4-diamino-6-tetrahydroxybutylpteridine boric acid complex was obtained as a tan solid.

*Example 4.—Addition of sulfate ion in the absence of boric acid*

The reactants and method of carrying out the condensation were as given in Example 3. After clarifying the hot reaction mixture the pH was adjusted to 7.0 by the addition of ammonium hydroxide and 660 milligrams of ammonium sulfate added. On cooling no pteridine precipitated.

*Example 5.—Pyrimidine sulfate, and boric acid added prior to the condensation, mole ratio of sugar to hydrazine to pyrimidine being 1:1:1 instead of 2:2:1 as in Example 3*

A dry mixture was prepared containing 530 milligrams of 2,4,5,6-tetraaminopyrimidine sulfate, 450 milligrams of L-sorbose, 300 milligrams of boric acid and 680 milligrams of sodium acetate trihydrate. This dry mixture was added to a solution of 0.15 milliliter of 85 percent hydrazine hydrate, 0.35 milliliter of glacial acetic acid dissolved in 7.0 milliliters of water. The reaction mixture was warmed to about ninety degrees centigrade for one hour and filtered while hot to clarify the solution. Upon cooling a precipitate appeared which was collected, washed with water, acetone and ether. After drying at sixty degrees centigrade under reduced pressure 440 milligrams of 2,4-diamino-6-tetrahydroxybutylpteridine boric acid complex was obtained as a light brown solid.

*Example 6.—Isolation of 2,4-diamino-6-(1',2',3'-trihydroxy-4'-carboxypropyl)pteridine using boric acid*

To a dry mixture of 1.065 grams of 2,4,5,6-tetraaminopyrimidine hydrochloride, 1.36 grams of sodium acetate tri-hydrate, 2.36 grams of calcium 5-keto gluconate and 600 milligrams of boric acid a solution of 1.4 milliliters of glacial acetic acid, 0.6 milliliter of 85 percent hydrazine hydrate and ten milliliters of water was added. The resulting bright yellow solution had a pH of 4.5 to 5.0. The reaction mixture was warmed to 85–95 degrees centigrade for about 45 minutes, the solution becoming dark brown. Upon cooling a precipitate formed which was collected, washed twice with water, once with alcohol and once with ether. After drying at sixty degrees centigrade under reduced pressure there was obtained 1.74 grams of 2,4-diamino-6-1',2',3'-trihydroxy-4'-carboxypropylpteridine as a light brown powder having ultraviolet absorption maxima at 257 mu and 370 mu, minima at 238 mu and 322 mu and an $$E\frac{257\ mu}{368\ mu}$$

ratio of 3.1.

Having thus described my invention I claim:

1. A method for the isolation of pteridines having the formula:

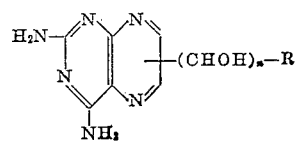

wherein $n$ is a member of the group of numbers consisting of zero and the positive integers one to three inclusive and R is a member of the group consisting of —CH$_2$OH and —COOH from reaction mixtures containing the same: comprising forming a boric acid complex of said pteridine by adding to the reaction mixture boric acid and sulfate ion and separating the pteridine boric acid complex from the reaction mixture.

2. The method of claim 1 wherein the pteridine is a 2,4-diamino-6-tetrahydroxybutylpteridine.

3. The method of claim 1 wherein the pteridine is 2,4-diamino-6-(1′,2′,3′-trihydroxy-4-carboxypropyl)pteridine.

4. A method for the isolation of pteridines having the formula

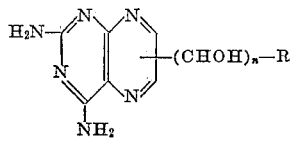

wherein $n$ is a member of the group of numbers consisting of zero and the positive integers one to three inclusive and R is a member of the group consisting of —$CH_2OH$ and —COOH from aqueous solutions: comprising forming a boric acid complex of said pteridine by adding boric acid to the solution while hot and in the presence of sulfate ion, adjusting the pH to neutrality, cooling the solution whereby the pteridine boric acid complex precipitates and separating the precipitate from the solution.

JOHN A. SCHMITT.

No references cited.